United States Patent
Peinado et al.

(10) Patent No.: US 9,430,402 B2
(45) Date of Patent: Aug. 30, 2016

(54) SYSTEM AND METHOD FOR PROVIDING STEALTH MEMORY

(71) Applicant: Microsoft Technology Licensing, LLC, Redmond, WA (US)

(72) Inventors: Marcus Peinado, Bellevue, WA (US); Taesoo Kim, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 14/533,024

(22) Filed: Nov. 4, 2014

(65) Prior Publication Data

US 2015/0067272 A1  Mar. 5, 2015

Related U.S. Application Data

(62) Division of application No. 12/973,912, filed on Dec. 21, 2010, now Pat. No. 8,996,814.

(51) Int. Cl.
| | |
|---|---|
| *G06F 12/12* | (2016.01) |
| *G06F 12/14* | (2006.01) |
| *G06F 21/55* | (2013.01) |
| *G06F 9/46* | (2006.01) |
| *G06F 12/08* | (2016.01) |
| *G06F 12/10* | (2016.01) |

(52) U.S. Cl.
CPC ............ *G06F 12/126* (2013.01); *G06F 9/461* (2013.01); *G06F 12/0831* (2013.01); *G06F 12/145* (2013.01); *G06F 21/556* (2013.01); *G06F 12/0842* (2013.01); *G06F 12/1009* (2013.01); *G06F 2212/1052* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 7,310,706 B1 | 12/2007 | Stribaek et al. | |
| 7,565,492 B2 | 7/2009 | McKeen et al. | |
| 7,620,057 B1 | 11/2009 | Aloni et al. | |
| 8,291,174 B2 * | 10/2012 | Resnick | G06F 12/0844 711/104 |
| 8,516,201 B2 | 8/2013 | Raikin et al. | |
| 8,996,814 B2 | 3/2015 | Peinado | |
| 2008/0109625 A1 | 5/2008 | Erlingsson et al. | |
| 2008/0133842 A1 | 6/2008 | Raikin et al. | |
| 2008/0147992 A1 | 6/2008 | Raikin et al. | |
| 2010/0180083 A1 | 7/2010 | Lee et al. | |

OTHER PUBLICATIONS

Kocher, P. C., "Timing Attacks on Implementations of Diffie-Hellman, RSA, DSS, and Other Systems.", Advances in Cryptology. 1996. pp. 104-113.

(Continued)

*Primary Examiner* — Gary Portka
(74) *Attorney, Agent, or Firm* — John Jardine; Judy Yee; Micky Minhas

(57) ABSTRACT

The described implementations relate to computer memory. One implementation provides a technique that can include providing stealth memory to an application. The stealth memory can have an associated physical address on a memory device. The technique can also include identifying a cache line of a cache that is mapped to the physical address associated with the stealth page, and locking one or more other physical addresses on the memory device that also map to the cache line.

20 Claims, 7 Drawing Sheets

| | | | Physical Address 300 | | | | |
|---|---|---|---|---|---|---|---|
| Virtual Page 301 | Allocated 302 | Tag 303 | cache line ID 304 | byte offset 305 | Valid Flag 306 | Stealth flag 307 | Virtual Address 308 |
| 0 | 105 | 0x00 | 0x0 | 0x0 | 1 | y | 0xFF00 |
| 1 | 106 | 0x01 | 0x2 | 0x0 | 1 | n | 0xFF10 |
| 2 | no | | | | | | |
| 3 | no | | | | | | |
| 4 | 106 | 0x02 | 0x0 | 0x0 | 0 | n | 0xFF20 |
| 5 | 106 | 0x04 | 0x0 | 0x0 | 1 | n | 0xFF40 |
| 6 | 106 | 0x06 | 0x0 | 0x0 | 1 | n | 0xFD80 |
| 7 | 106 | 0x08 | 0x0 | 0x0 | 1 | n | 0xDD00 |

(56) References Cited

OTHER PUBLICATIONS

Wang et al., "A Novel Cache Architecture with Enhanced Performance and Security.", Proceedings of the 41st Annual IEEE/ACM International Symposium on Microarchitecture. Dec. 2008. pp. 83-93.
Suzaki et al., "Memory Deduplication as a Threat to the Guest OS.", Proceedings of the Fourth European Workshop on System Security (EUROSEC '11). Apr. 10, 2011. pp. 1:1-1:6.
Raj et al., "Resource Management for Isolation Enhanced Cloud Services.", Proceedings of the 2009 ACM Cloud Computing Security Workshop. 2009. pp. 77-84.
Schneier, B., "The Blowfish Source Code.", online at: <<http://web.archive.org/web/20100102040408/http://schneier.com/blowfish-download.html>>, Jan. 2, 2010. 1 page.
Moscibroda et al., "Memory Performance Attacks: Denial of Memory Service in Multi-core Systems.", Proceedings of the 16th USINEX Security Symposium. 2007. pp. 257-274.
Müller et al., "AESSE: A Cold-boot Resistant Implementation of AES.", Proceedings of the Third European Workshop on System Security. Apr. 13, 2010. pp. 42-47.
Schneier, B., "The Blowfish Encryption Algorithm.", online at: <<http://web.archive.org/web/20150317064848/https://www.schneier.com/blowfish.html>>, Dec. 6, 2010. 2 pages.
Page, D., "Theoretical Use of Cache Memory as a Cryptanalytic Side-channel.", Tech. Rep. CSTR-02-003, Department of Computer Science, University of Bristol. Jun. 2002, 23 pages.
Wang, et al., "New Cache Designs for Thwarting Software Cache-based Side Channel Attacks", Retrieved at << http://palms.princeton.edu/system/files/p494-wang.pdf >>, 19th ACM Symposium on Parallelism in Algorithms and Architectures, Jun. 9-11, 2007, pp. 494-505.
Page, D., "Partitioned Cache Architecture as a Side-Channel Defence Mechanism", Retrieved at << http://eprint.iacr.org/2005/280.pdf >>, 2005, pp. 14.
Erlingsson, et al., "Operating system protection against side-channel attacks that exploit memory latency", Retrieved at << http://research.microsoft.com/pubs/64367/tr-2007-117.pdf >>, MSR-TR-2007-117, Aug. 2007, pp. 7.
Tromer, et al., "Efficient Cache Attacks on AES, and Countermeasures", Retrieved at << http://people.csail.mit.edu/ tromer/papers/cache-joc-20090619.pdf >>, Journal of Cryptology, vol. 23, No. 2, Jan. 2010, pp. 1-34.
Amazon Inc., "Amazon Elastic Compute Cloud (EC2)", online at: <<https://web.archive.org/web/20101202002038/https://aws.amazon.com/ec2/>>, Dec. 2, 2010, 6 pages.
Mangalindan, J., "Is User Data Safe in the Cloud?", online at <<http://tech.fortune.cnn.com/2010/09/24/is-user-data-safe-in- the-cloud. Sep. 2010, 5 pages.
Microsoft Inc., Microsoft Azure Services Platform, online at: <<https://web.archive.org/web/20111212223225/http://www.windowsazure.com/en-us/>>, 3 pages.
Ristenpart et al., "Hey, You, Get Off of My Cloud: Exploring Information Leakage in Third-party Compute Clouds.", Proceedings of the 16th ACM Conference on Computer and Communications Security. 2009. pp. 199-212.
Aciicmez, O., "Yet Another Microarchitectural Attack: Exploiting I-Cache.", CSAW'07: Proceedings of the 2007 ACM Workshop on Computer Security Architecture. New York, NY. 2007. pp. 11-18.
Koeune et al., "A Timing Attack Against Rijndael.", Tech. Rep. CG 1999/1, 1999, 7 pages.
Daemen et al., AES Proposal: Rijndael, version 2, AES submission, Mar. 9, 1999, online at: <<http://csrc.nist.gov/archive/aes/rijndael/Rijndael-ammended.pdf>>, 45 pages.
Bernstein, D. J., "Cache-timing Attacks on AES", <<http://cr.yp.to/antiforgery/cachetiming-20050414.pdf>>, 2005, 37 pages.
Bonneau et al., "Cache-collision Timing Attacks Against AES", Proceedings of the 8th International Workshop on Cryptographic Hardware and Embedded Systems. 2006. pp. 201-215.
Osvik et al., "Cache Attacks and Countermeasures: The Case of AES.", Topics in Cryptology—CT-RSA 2006, The Cryptographers Track at the RSA Conference 2006. 2005. pp. 1-20.
Tsunoo et al., "Cryptanalysis of DES Implemented on Computers with Cache.", Proceedings of the 2003 Cryptographic Hardware and Embedded Systems. 2003. pp. 62-76.
Percival, C., "Cache Missing for Fun and Profit.", BSDCan 2005, Ottowa, 2005, 13 pages.
Neve et al., "Advances on Access-driven Cache Attacks on AES.", Selected Areas in Cryptography vol. 4356. 2007. pp. 147-162.
Kong et al., "Hardware-software Integrated Approaches to Defend Against Software Cache-based Side Channel Attacks.", Proceedings of the 15th International Conference on High Performance Computer Architecture. 2009. pp. 393-404.
Wang et al., "Covert and Side Channels Due to Processor Architecture.", Proceedings of the 22nd Annual Computer Security Applications Conference. Dec. 2006. pp. 473-482.
Kong et al., "Deconstructing New Cache Designs for Thwarting Software Cache-based Side Channel Attacks.", Proceedings of the 2nd ACM Workshop on Computer Security Architectures. 2008. pp. 25-34.
"Data Encryption Standard (DES)", FIPS PUB 46 Federal Information Processing Standards Publication, 1977, revisited Oct. 25, 1999, 26 pages.
"Advanced Encryption Standard (AES)", FIPS PUB 197 Federal Information Processing Standards Publication, Nov. 26, 2001, 51 pages.
Aciicmez et al., "Trace-Driven Cache Attacks on AES", Cryptology ePrint archive, Report 2006/138, Dec. 4, 2006, 17 pages.
Aciicmez et al., "Cache Based Remote Timing Attack on the AES", Topics in Cryptology-CT-RSA 2007, The Cryptographers' Track at the RSA Conference 2007, 2007 Springer-Verlag. pp. 271-286.
Kim et al., "StealthMem: System-Level Protection Against Cache-Based Side Channel Attacks in the Cloud", Proceedings of the 21st USENIX Security Symposium, Aug. 8-10, 2012. 16 Pages.
AMD Inc., AMD64 Architecture Programmer's Manual. No. 24594, Feb. 2005, 397 pages.
Aviram et al., "Determinating Timing Channels in Compute Clouds", Proceedings of the 2010 ACM Cloud Computing Security Workshop. Oct. 8, 2010. pp. 103-108.
Zhang et al., "Home-Alone: Co-residency Detection in the Cloud via Side-channel Analysis.", Proceedings of the 2011 IEEE Symposium on Security and Privacy. May 22-25, 2011. pp. 313-328.
Xu et al., "An Exploration of L2 Cache Covert Channels in Virtualized Environments.", Proceedings of the 2011 ACM Cloud Computing Security Workshop. May 22-25, 2011. pp. 29-40.
Brickell et al., "Software Mitigation to Hedge AES Against Cache-based Software Side Channel Vulnerabilities", IACR ePrint Archives, Report 2006/052. 2006, 17 pages.
Coppens et al., "Practical Mitigations for Timing-based Side-channel Attacks on Modern x86 Processors", Proceedings of the 2009 IEEE Symposium on Security and Privacy. May 17-20, 2009. pp. 45-60.
Domnitser et al., "Non-monopolizable Caches: Low-complexity Mitigation of Cache Side-channel Attacks.", ACM Transactions on Architecture and Code Optimization 8. Jan. 2012. 35:1-35:21.
Gullasch et al., "Cache Games—Bringing Access-based Cache Attacks on AES to Practice.", Proceedings of the 2011 IEEE Symposium on Security and Privacy. May 22, 2011. pp. 490-505.
Hu, W. M., "Reducing Timing Channels with Fuzzy Time", Proceedings of the 1991 IEEE Symposium on Security and Privacy. May 20-22, 1991. pp. 8-20.
Intel Inc., Intel 64 and IA-32 Architectures Software Developer's Manual. No. 253669-033US, Dec. 2009, 910 pages.
Intel Inc., Advanced Encryption Standard (AES) Instructions Set. http://software.intel.com/file/24917, Jan. 2010, 79 pages.
Ion et al., "Home is Safer than the Cloud! Privacy Concerns for Consumer Cloud Storage.", Proceedings of the Seventh Symposium on Usable Privacy and Security. Jul. 20, 2011. pp. 13:1-13:20.
Jaleel, A., "Memory Characterization of Workloads Using Instrumentation-driven Simulation—a Pin-based Memory Characterization of the SPEC CPU2000 and SPEC CPU2006 Benchmark Suites.", Tech. rep., VSSAD. 2007, 12 pages.

(56) References Cited

OTHER PUBLICATIONS

Jansen et al., "Guidelines on Security and Privacy in Public Cloud Computing", NIST Special Publication 800-144. Dec. 2011, 80 pages.
Kim et al., "Fair Cache Sharing and Partitioning in a Chip Multiprocessor Architecture", Proceedings of the 13th International Conference on Parallel Architectures and Compilation Techniques. Sep. 29, 2004. pp. 111-122.
Non Final Office Action Mailed Aug. 30, 2013, From U.S. Appl. No. 12/973,912; 11 pages.
Response filed Dec. 27, 2013, to Non Final Office Action Mailed Aug. 30, 2013, From U.S. Appl. No. 12/973,912, 11 pages.
Final Office Action Mailed Apr. 10, 2014, U.S. Appl. No. 12/973,912, 8 pages.
RCE/Response filed Jul. 10, 2014 to Final Office Action Mailed Apr. 10, 2014, From U.S. Appl. No. 12/973,912, 15 pages.
Notice of Allowance Mailed Aug. 1, 2014, From U.S. Appl. No. 12/973,912, 5 pages.
Notice of Allowance Mailed Dec. 2, 2014, U.S. Appl. No. 12/973,912, 9 pages.
Notice of Allowance Mailed Feb. 6, 2015, U.S. Appl. No. 12/973,912, 4 pages.
Wikipedia search results for "CPU Cache", retrieved at <<http://wikipedia.org/wiki/CPU_Cache>>, on Oct. 9, 2010, 15 pages.
Wikipedia search results for "Pseudo-LRU", retrieved at <<http://wikipedia.org/wiki/Pseudo-LRU>>, on Sep. 13, 2006, 1 page.

\* cited by examiner

| 102 | | | |
|---|---|---|---|
| Cache Line 201 | Tag 202 | Data 203 | Dirty Bit 204 |
| 0x0 | 0x00 | data0 | 0 |
| 0x1 | 0x00 | data1 | 0 |
| 0x2 | 0xFF | data2 | 0 |
| 0x3 | 0xFC | data3 | 0 |
| ... | | | |
| 0xF | 0x1D | dataF | 0 |

FIG. 2

|  | | 300 | | | | | |
| --- | --- | --- | --- | --- | --- | --- | --- |
|  | | Physical Address | | | | | |
| Virtual Page 301 | Allocated 302 | Tag 303 | cache line ID 304 | byte offset 305 | Valid Flag 306 | Stealth flag 307 | Virtual Address 308 |
| 0 | 105 | 0x00 | 0x0 | 0x0 | 1 | y | 0xFF00 |
| 1 | 106 | 0x01 | 0x2 | 0x0 | 1 | n | 0xFF10 |
| 2 | no | | | | | | |
| 3 | no | | | | | | |

FIG. 3

| 102 | | | | |
|---|---|---|---|---|
| Cache Line 201 | Slot 501 | Tag 202 | Data 203 | Dirty Bit 204 |
| 0x0 | 0 | 0x00 | data01 | 0 |
| | 1 | 0x04 | data02 | 0 |
| | 2 | 0x06 | data03 | 0 |
| | 3 | 0x08 | data04 | 0 |
| 0x1 | 0 | 0x20 | data11 | 0 |
| | 1 | 0x2E | data12 | 0 |
| | 2 | 0x30 | data13 | 0 |
| | 3 | 0x1F | data14 | 0 |
| ... | | | | |
| 0xF | 0 | 0xFD | dataF1 | 0 |
| | 1 | 0x28 | dataF2 | 0 |
| | 2 | 0x2C | dataF3 | 0 |
| | 3 | 0x22 | dataF4 | 0 |

FIG. 5

| | | 300 | | | | | |
|---|---|---|---|---|---|---|---|
| | | Physical Address | | | | | |
| Virtual Page 301 | Allocated 302 | Tag 303 | cache line ID 304 | byte offset 305 | Valid Flag 306 | Stealth flag 307 | Virtual Address 308 |
| 0 | 105 | 0x00 | 0x0 | 0x0 | 1 | y | 0xFF00 |
| 1 | 106 | 0x01 | 0x2 | 0x0 | 1 | n | 0xFF10 |
| 2 | no | | | | | | |
| 3 | no | | | | | | |
| 4 | 106 | 0x02 | 0x0 | 0x0 | 0 | n | 0xFF20 |
| 5 | 106 | 0x04 | 0x0 | 0x0 | 1 | n | 0xFF40 |
| 6 | 106 | 0x06 | 0x0 | 0x0 | 1 | n | 0xFD80 |
| 7 | 106 | 0x08 | 0x0 | 0x0 | 1 | n | 0xDD00 |

FIG. 6

SYSTEM AND METHOD FOR PROVIDING STEALTH MEMORY

CROSS-REFERENCE TO RELATED APPLICATIONS

This patent application is a divisional of, and claims priority to, U.S. patent application Ser. No. 12/973,912, filed on Dec. 21, 2010, which is incorporated herein by reference in its entirety.

BACKGROUND

Computers often share physical resources such as a cache memory and a main memory amongst a number of different applications. Usually, the cache memory of a computer will have a higher access speed than the main memory, and physical addresses on the main memory are mapped to particular locations on the cache, known as cache lines. Sometimes, one or more of the applications sharing the cache and memory is an "attacker" that is attempting to compromise another application, such as by reading secret data or causing the application to crash or otherwise execute incorrectly. Attackers can sometimes exploit certain characteristics of these shared resources to compromise other applications.

As a particular example, one way for an attacker to obtain secret data from another application is known as a "cache side channel attack." In a cache side channel attack, the attacker accesses one or more physical memory addresses and uses a precise timer to determine how long each access takes. If the access time exceeds the cache latency, the attacker knows that other physical memory addresses that map to the cache line have been used by another application. By repeatedly measuring how long it takes to access physical memory, the attacker can gather information about the memory access patterns of the other application. In some cases, the attacker can even derive a cryptographic key used by the other application, because memory access patterns used for encrypting or decrypting data can vary depending on the cryptographic key.

SUMMARY

The described implementations relate to providing computer memory to one or more applications. One implementation is manifested as a technique that can include providing stealth memory to an application. The stealth memory can have an associated physical address on a memory device. The technique can also include identifying a cache line of a cache that is mapped to the physical address associated with the stealth page, and locking one or more other physical addresses on the memory device that also map to the cache line.

Another implementation is manifested as one or more computer-readable storage media having stored instructions to cause one or more processors to perform instructions which, when executed by one or more processing devices, cause the one or more processing devices to perform providing a first unit of stealth memory having an associated first physical address in a memory device. The first physical address can be one of a bucket of physical addresses that are mapped to a cache line. The instructions can also cause the one or more processors to perform configuring a memory monitor to receive an alert indicating an access to the cache line, receiving the alert in an instance when the access to the cache line is requested, and swapping a second unit of memory from the bucket out of the physical memory, responsive to the alert.

Another implementation is manifested as a system that can include two or more processor cores, a cache, a memory, and a memory monitor. The memory monitor can be configured to select a physical address on the memory that is restricted for use by a first one of the two or more processor cores, and provide stealth memory to a first application. The stealth memory can be associated with the selected physical address.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 2 and 5 show exemplary components of a device in accordance with some implementations of the present concepts.

FIGS. 3 and 6 show exemplary data structures in accordance with some implementations of the present concepts.

DETAILED DESCRIPTION

Overview

The described implementations relate to providing memory, and more specifically to providing one or more applications with "stealth memory." For the purposes of this document, stealth memory is memory that is provided to an application that can limit the ability of other applications to identify memory and/or cache access patterns by the application using the stealth memory. Stealth memory can be locked using various techniques to accomplish these objectives. For example, one way to lock stealth memory is to ensure that other applications are not allocated any physical memory that maps to the same cache line as the stealth memory. Because the other applications do not have any physical memory that maps to the cache lines used by the stealth memory, the other applications can be prevented from performing the cache side channel attack discussed above.

Another technique to lock stealth memory is to load the stealth memory into the cache before allowing other applications to execute. This technique can allow other applications to share one or more cache lines with the stealth memory. Because the stealth memory is in the cache each time that the other application begins executing, the other application will not be able to use the timing techniques discussed above to discern memory access patterns for the application that is using the stealth memory.

Figure 1:
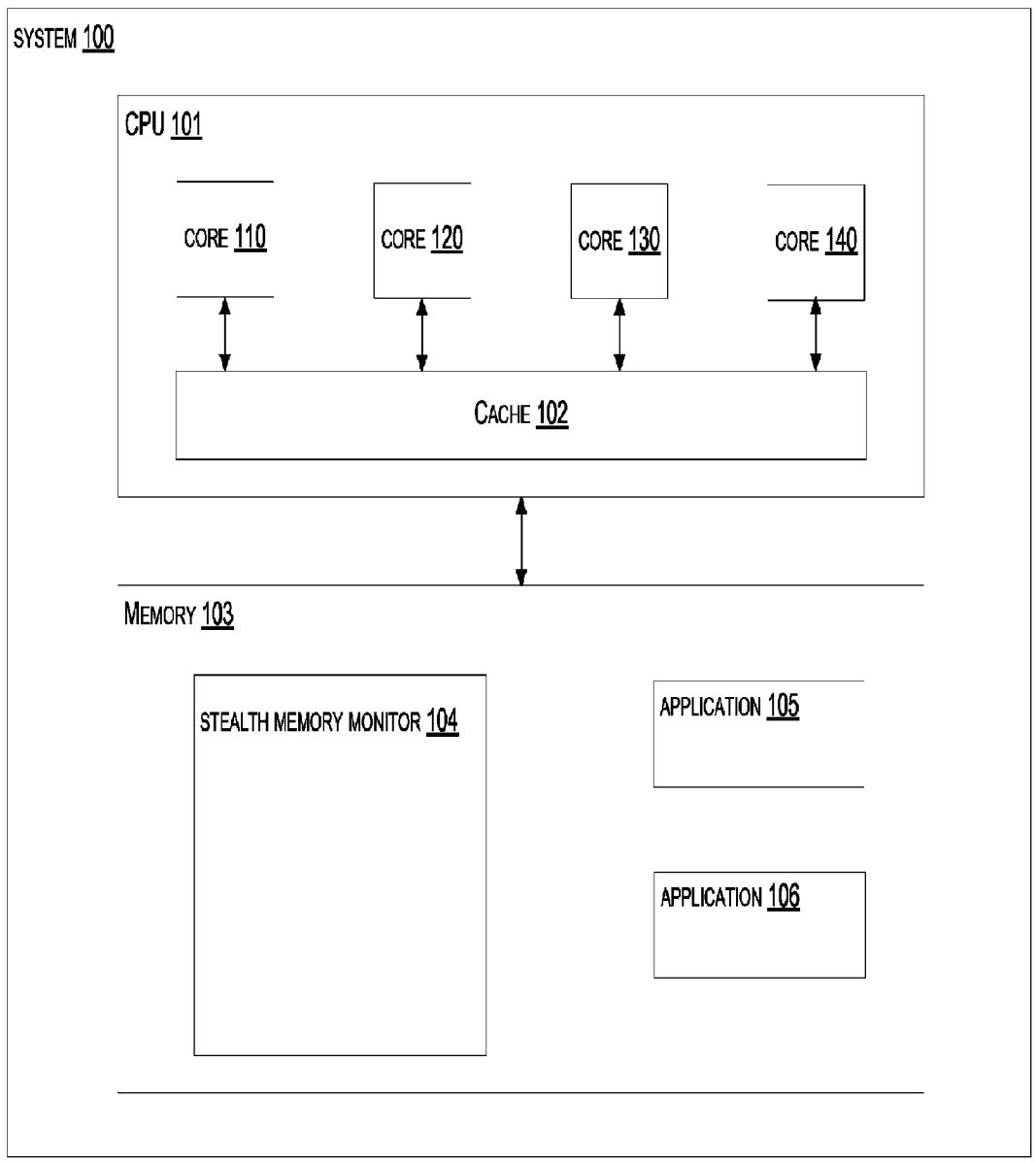
FIG. 1 shows an example of an operating environment in accordance with some implementations of the present concepts.

FIG. 1 shows an exemplary system 100 that is consistent with the disclosed implementations. As shown in FIG. 1, system 100 can represent an exemplary architecture of a computer or other device that is configured to accomplish the concepts described above and below. System 100 can include a processing device such as a central processing unit ("CPU") 101. CPU 101 can include a cache 102 that is shared by multiple processing cores 110, 120, 130, and 140.

In some implementations, CPU 101 can be a reduced instruction set computing (RISC) or complex instruction set computing (CISC) microprocessor that is connected to a memory 103 via a bus. Memory 103 can be a volatile storage device such as a random access memory (RAM), or non-volatile memory such as FLASH memory. Although not shown in FIG. 1, system 100 can also include various input/output devices, e.g., keyboard, mouse, display, printer, etc. Furthermore, system 100 can include one or more non-volatile storage devices, such as a hard disc drive (HDD), optical (compact disc/digital video disc) drive, tape drive, etc. Generally speaking, data processed by system 100 can be stored in memory 103, and can also be committed to non-volatile storage. For the purposes of this document, the term "computer-readable storage media" can include both volatile and non-volatile storage devices.

Generally speaking, cache 102 can be a relatively fast memory, whereas memory 103 can be relatively slow in comparison to cache 102. In other words, writing data from one of cores 110-140 to cache 102 can take less time than to write the same data to memory 103. Likewise, reading data from cache 102 to one of cores 110-140 can take less time than reading the data from memory 103.

For example, in implementations where cache 102 is a level 1 ("L1") cache, cache 102 can include approximately 32 kilobytes ("KB") of memory capacity, and can use approximately 1-3 CPU cycles each time data is transferred between cache 102 and one of cores 110-140. In contrast, memory 103 can include approximately 2-4 gigabytes ("GB") of memory capacity, and can use approximately 100-1000 CPU cycles each time data is transferred between memory 103 and one of cores 110-140.

In other implementations, CPU 101 includes multiple caches, such as one or more L1 caches, one or more level 2 ("L2") caches, and one or more level 3 ("L3") caches. An L2 cache can include approximately 2-4 megabytes ("MB") of memory, and take 20 or 30 CPU cycles to read and/or write data. An L3 cache can include approximately 4-16 MB of memory, and can take approximately 50 CPU cycles to read and/or write data.

The sizes and speeds of cache 102 and memory 103 disclosed herein are exemplary and are provided for the purposes of explaining the memory hierarchy of system 100 in the context of a representative modern computer. However, modern computers and other processing devices exhibit a broad range of technical specifications such as the size, speed, and number of caches and/or main memory, number of CPU cores, etc. Moreover, those skilled in the art will understand that the sizes and speeds of various types of cache and main memory change over time. Thus, those skilled in the art will also understand that the techniques disclosed herein are consistent with many different memory architectures including any number of caches, processor cores, and/or main memories.

Memory 103 of system 100 can include various components that implement certain processing described herein. For example, memory 103 can include a stealth memory monitor 104 and applications 105 and 106. Generally speaking, stealth memory monitor 104 can be responsible for providing virtual memory to applications 105 and 106. Virtual memory is an abstraction that allows physical addresses on memory 103 to be mapped to logical addresses in virtual memory.

In some implementations, stealth memory monitor 104 can be part of an operating system or operating system kernel executing on system 100. In such implementations, applications 105 and 106 can be applications installed on system 100 that interact with the operating system to perform various functions. In other implementations, stealth memory monitor 104 is part of a virtual machine monitor ("VMM") and applications 105 and 106 can represent individual virtual machines executing on system 100. For example, applications 105 and 106 can include different operating systems that use virtual memory allocated by stealth memory monitor 104. In such implementations, applications 105 and 106 can host other applications using the virtual memory provided by stealth memory monitor 104.

Note also that stealth memory monitor 104 and applications 105 and 106 can include computer-readable instructions that are suitable for execution by one or more of cores 110-140. These instructions can be stored in non-volatile storage and retrieved to memory 103 to implement the processing described herein. Furthermore, some or all of the instructions can also be stored in cache 102 for execution by cores 110-140.

FIG. 2 illustrates an exemplary cache 102 that is consistent with the disclosed implementations. FIG. 2 illustrates a direct-mapped 16-bit cache with a capacity of 256 bytes. Furthermore, for the purposes of discussion, memory 103 can be a 16-bit memory that is byte-addressable and includes 64 k bytes of memory. Thus, a 16-bit value can uniquely identify a physical address of a byte of data stored on memory 103. Note that cache 102 is shown in this relatively simple 16-bit, direct-mapped configuration because it will be easier to explain certain concepts. As already discussed, however, in practice, cache 102 may have a much different configuration, e.g., different number of bits (32, 64, etc.), set-associative or fully-associative, more data capacity, etc.

As shown in FIG. 2, cache 102 can have 16 cache lines 201 numbered 0x0 through 0xF (hexadecimal notation) or 0 through 15 (decimal notation). Each one of cache lines 201 can have an 8-bit tag 202, and can store 16 bytes of data 203. Tag 202 can include the eight high-order bits of the physical memory address stored therein. Thus, if any of physical memory addresses 0x0000 through 0x00FF of memory 103 are stored in a given cache line 201, tag 202 will have a value of 0x00. Similarly, if any of memory addresses 0xFF00 through 0xFFFF are stored in a given cache line 201, tag 202 will have a value of 0xFF for that cache line.

As mentioned above, data 203 can include 16 bytes of data that correspond to a physical address on memory 103. Generally speaking, the 16 bytes can be consecutive memory addresses. Each physical address on memory 103 can be mapped to a particular cache line by the second-lowest order nibble (one nibble=four bits) of the physical address. Thus, for a two-byte (16-bit=4 nibble) address 0xWXYZ, the third nibble "Y" can determine which cache line the physical address is mapped to. Each physical memory address can thus map to one of the 16 cache lines 201, depending on the value of this nibble. For the purposes of this document, the group of memory addresses that collectively map to a common cache line will be referred to as a "bucket" of addresses. Thus, memory addresses with a "Y" nibble of 0x0 are included in a first bucket of addresses, memory addresses with a "Y" nibble of 0x1 are included in a second bucket of addresses, and so on. In the example of FIG. 2 with 16 cache lines, memory 103 includes a total of 16 buckets of addresses.

Furthermore, each time a given physical memory address is loaded into cache 102, 16 consecutive bytes at that physical memory address can be stored in data 203. For example, when a physical address of 0x0000 is accessed by one of cores 110-140, the 16 bytes of data at addresses 0x0000 through 0x000F can be loaded into data 203 of cache 102, at cache line 0x0. As another example, for an access to a physical address of 0xFFF0, the 16 bytes of data at addresses 0xFFF0 through 0xFFFF can be loaded into data 203 of cache 102, at cache line 0xF.

Cache 102 can also include a dirty bit 204. Generally speaking, if data 203 is modified in cache 102 but not written to memory 103, this means that there can be different values in cache 102 and memory 103. Dirty bit 204 can be set to "1" when data 203 is written in cache 102, and set back to 0 when data 203 is written to memory 103 and/or data from memory 103 is read into cache 102. Those skilled in the art will understand that different computing architectures may use different cache writing policies, and some of these implementations will not necessarily include dirty bit 204. For example, in some implementations, cache 102 can be a "write-through" cache where, when data 203 is written to cache 102, the data is also synchronously written to memory 103.

FIG. 3 illustrates an exemplary page table 300, consistent with the disclosed implementations. Generally speaking, stealth memory monitor 104 can use a data structure such as page table 300 to track allocations of virtual memory to applications 105 and 106. For example, stealth memory monitor 104 can use virtual memory to provide a contiguous virtual address space to applications 105 and 106, and can translate virtual memory addresses to physical memory addresses on memory 103 that are not necessarily contiguous.

As shown in FIG. 3, page table 300 can include fields such as virtual page 301, which can identify a given page of virtual memory. For the purposes of this example, each page of virtual memory can include 16 bytes, so that each page of virtual memory can fit in a single cache line 201. Thus, as cache 102 includes 16 cache lines, 16 pages of virtual memory can fit in cache 102 at any given time. Note that 16 bytes is chosen as a convenient page size for exposition of the present example, so that one page of memory will fit in one cache line. However, in many implementations page sizes will be much larger, e.g., 4096 bytes, etc. Examples where one page of memory is too large to be stored in a single cache line will also be discussed below.

Page table 300 can also include an allocated field 302, which can indicate which, if any, application has been allocated the corresponding virtual page 301. Thus, considering FIG. 3, virtual page 0 has been allocated to application 105 and virtual page 1 has been allocated to application 106. Furthermore, virtual pages 2 and 3 are each unallocated, meaning that virtual pages 2 and 3 can be allocated to an application that requests a page of virtual memory without first having to deallocate a virtual page from application 105 or 106.

Page table 300 can also include the physical address of each allocated page of virtual memory, represented as an 8-bit tag field 303, 4-bit cache line ID 304, and 4-bit byte offset 305. Generally speaking, fields 303-305 identify the physical address on memory 103 where each page of virtual memory is stored. Note that when a given page of virtual memory is loaded into cache 102, tag field 303 of page table 300 can be loaded into tag 202 of cache 102. Furthermore, data 203 of cache 102 can be populated with one page (16 bytes) of data from the physical address of the virtual page. Byte offset 305 is shown primarily for the purpose of illustrating the entire physical address format in FIG. 3. In many implementations, byte offset 305 will always have a value of 0x0, and does not need to tracked in a data structure such as page table 300.

Valid flag 306 can be used to track whether a given page of virtual memory is actually stored in physical memory. If valid flag 306 is a "1," this means that the corresponding page of virtual memory is "valid" and is actually physically stored in memory 103. In contrast, if valid flag 306 is "0," this means that there is no physical page for the corresponding virtual page, i.e., that the table entry is invalid. Generally speaking, if access to a virtual page is attempted by an application and valid flag 306 has a value of "0," this can cause CPU 101 to generate a "page fault" that invokes a context switch to stealth memory monitor 104. Stealth memory monitor 104 can handle the page fault in various ways, e.g., by loading the data for the corresponding virtual page from permanent storage into an address in physical memory, and update table 300 accordingly.

Stealth flag 307 can be used to track whether a given page of virtual memory is processed by stealth memory monitor 104 as "stealth memory." Generally speaking, stealth memory monitor 104 can process stealth pages for an application such as application 105 to limit the ability of other applications, such as application 106, to monitor whether the stealth page has been loaded into cache 102. For example, in some implementations, stealth memory monitor 104 can prevent application 106 from accessing physical memory that maps to the same cache lines as the stealth page allocated to application 105. Note that stealth flag 307 is included in page table 300 for exemplary purposes only. Stealth memory monitor 104 can use various implementations to track which virtual pages of memory are treated as stealth memory, e.g., an array or other data structure that is maintained separately from page table 300.

As another example, stealth memory monitor 104 can cause the stealth page to be loaded into cache 102 before context switching from application 105 to application 106. If stealth memory monitor 104 does so for each context switch, the stealth page will be in cache 102 each time application 106 begins processing after the context switch. Thus, application 106 is unable to discern the memory access patterns of application 105 using the timing techniques discussed above. Moreover, using this technique, stealth memory monitor 104 can allocate physical memory addresses that map to the same cache lines as the stealth page. Exemplary processing for "stealth memory" pages is discussed in more detail below.

Virtual address field 308 can represent a virtual address that is provided by stealth memory monitor 104 to applications 105 and/or 106. When application 105 and/or 106 accesses a given virtual address location, the address can be translated by CPU 101 to a physical address on memory 103. In some implementations, using virtual address field 308 allows stealth memory monitor 104 to provide applications 105 and/or 106 with an address space that is larger than the physical capacity of memory 103.

Note that page table 300 is shown here in an abstract configuration that is chosen for exposition of the present concepts. However, page tables can be implemented in various fashions depending on processor architectures, operating systems, or other implementation considerations. For example, the disclosed techniques can be applied to inverted page tables, multi-level page tables, nested page tables, etc. Moreover, the information reflected by each field of page table 300 does not necessarily need to be maintained in a page table. Rather, page table 300 is shown herein as a generic example of how to maintain information pertinent to the disclosed implementations. It is expected that specific implementations of the disclosed techniques will use different data organizations to maintain information such as that discussed herein with respect to table 300.

Figure 4:
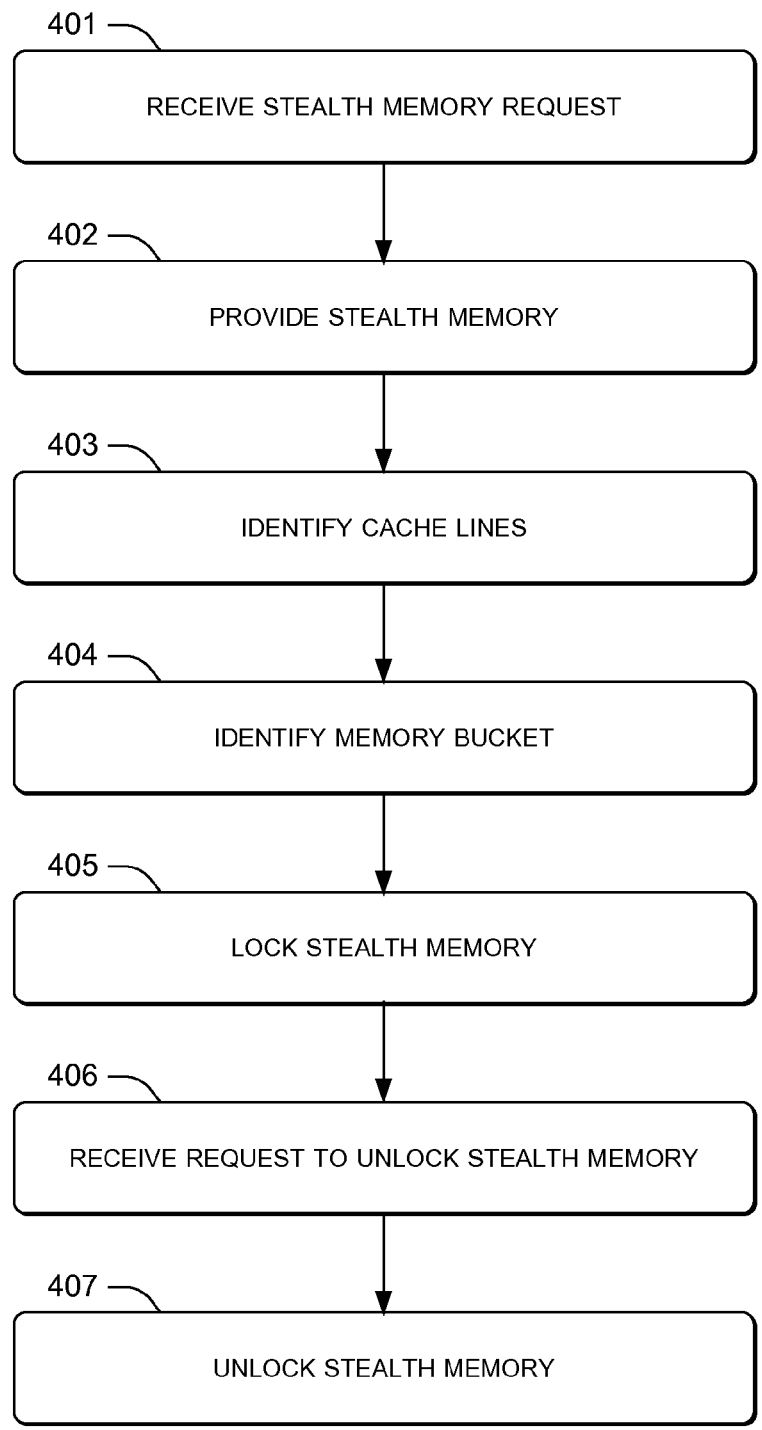
FIGS. 4 and 7 show flowcharts of exemplary methods that can be accomplished in accordance with some implementations of the present concepts.

FIG. 4 illustrates a method 400 for providing stealth memory. For example, stealth memory monitor 104 can provide stealth memory to applications 105 and/or 106 using method 400. Note, however, that method 400 is discussed herein as being implemented by stealth memory monitor 104 for exemplary purposes, and is suitable for implementation in various other contexts. Furthermore, method 400 is discussed with respect to system 100, but is also suitable for implementation in various other systems.

Note also that the following discussion of method 400 uses a simple example where applications 105 and 106 are time-sharing a single processor core, e.g., core 110. Examples where applications are executing on more than one CPU core are discussed after the initial introduction of method 400 with this single-core time-sharing example.

A request for stealth memory is received at block 401. For example, application 105 can send a request to be allocated a new page of stealth memory to stealth memory monitor 104. Alternatively, application 105 can have a page of virtual memory already allocated to it, and can request that stealth memory monitor 104 convert the already-allocated page of memory to stealth memory. As discussed above, stealth memory monitor 104 can allocate memory to applications 105 and 106 as virtual memory which is mapped to physical addresses on memory 103.

Stealth memory can be provided at block 402. For example, stealth memory monitor 104 can provide a unit of stealth memory responsive to the request. Stealth memory monitor 104 can allocate a new page of virtual memory to application 105 in response to the request, or can convert a previously-allocated page of virtual memory to stealth memory. If stealth memory monitor 104 is allocating a new page of stealth memory, stealth memory monitor 104 can add an entry to column 301 of page table 300 indicating a new page 0 of virtual memory is assigned to application 105, and make a corresponding entry in stealth flag 307 to "y" to indicate that the new page is stealth memory. Alternatively, if application 105 has previously been allocated page 0 and is requesting that page 0 be converted to stealth memory, column 301 will already indicate that page 0 is allocated to application 105, and stealth memory monitor 104 can simply update stealth flag 301 to "y." As shown in FIG. 3, virtual page 0 is mapped to a physical address of 0x0000 on memory 103.

Cache lines can be identified at block 403. For example, stealth memory monitor 104 can identify the cache lines that could be occupied by the virtual page that was allocated at block 402. In the example shown here, virtual page 0 maps to cache line 0x0. Thus, stealth memory monitor 104 identifies cache line 0x0 as the cache line that could be occupied in physical memory by virtual page 0.

A bucket of memory can be identified at block 404. For example, stealth memory monitor 104 can identify the memory addresses that map to the same cache line as the stealth page, in this example cache line 0x0. Thus, any physical memory address with a third nibble of 0x0 is part of the bucket identified in this example.

The virtual memory can be locked at block 405. For example, stealth memory monitor 104 can prevent other applications from allocating any page of memory that has a physical address that is in the bucket with the stealth memory. In other words, other applications cannot allocate memory that also maps to the same cache lines the physical address of the stealth page. In this example, any physical memory address with a cache line ID of 0x0 would not be allocated by stealth memory monitor 104 while the stealth memory for virtual page 0 is locked.

A request to unlock the stealth memory is received at block 406. For example, application 105 can submit a request to stealth memory monitor 104 to deallocate the stealth page and free the virtual memory page for use by other applications. Under such circumstances, stealth memory monitor 104 can clear the row of page table 300 for virtual page 0. Alternatively, application 105 can submit a request to convert the stealth page to a non-stealth page, while retaining the page for use by application 105. Under such circumstances, stealth memory monitor 104 can retain the data in page table 300 for virtual page 0, and set the stealth flag to "0."

The stealth memory is unlocked at block 407. For example, stealth memory monitor 104 can resume allocating physical memory from the bucket. In other words, pages that map to the same cache lines as virtual page 0 can now be allocated to other applications, e.g. application 106, because application 105 is no longer using the stealth memory.

Note that the above-disclosed implementation causes one-sixteenth of physical memory to be locked, because ¹⁄₁₆ of the physical addresses on memory 103 are in the same bucket as the stealth memory. Under some circumstances, this can be undesirable because the physical address space of memory 103 can be quickly exhausted. For example, if 16 pages of stealth memory are allocated in this scenario, no other physical memory buckets would be available.

To address this concern, stealth memory monitor 104 can take a different approach to locking the stealth memory page. Instead of preventing other applications such as application 106 from allocating any physical addresses that are in the same bucket as the stealth page, stealth memory monitor 104 can access the stealth page each time a context switch is performed from application 105 to another application. This will cause the stealth page to be loaded into cache 102. Thus, each time another application accesses any physical memory address that is in the bucket with the stealth memory, the data for the stealth memory will be in cache 102. This can prevent another application such as application 106 from performing the above-described timing techniques to discern the memory access patterns of application 105.

Note that a context switch occurs from application 105 to stealth memory monitor 104 so that stealth memory monitor 104 can access the stealth page. Otherwise, if a context switch occurred immediately from application 105 to 106, stealth memory monitor 104 would not have time to perform the access. Generally speaking, stealth memory monitor 104 can be invoked via various mechanisms so that switching between applications goes through the stealth monitor. In examples discussed herein, a page fault is used as such a mechanism, e.g., stealth memory monitor 104 can be invoked via a context switch whenever a page in the bucket with the stealth memory is accessed by an application. For example, in some implementations, stealth memory monitor 104 can be configured such that any attempt to access a physical memory address in the same bucket as the stealth memory causes a page fault. The page fault can cause a context switch to stealth memory monitor 104. Stealth memory monitor 104 can be configured to receive the page fault by setting valid flag 306 to "0" for any physical address in the same bucket as the stealth memory.

As an example of the above-described technique, consider a circumstance where application 106 is executing on core 110, and attempts to access a physical address in the same bucket as the stealth page. A page fault occurs, which causes a corresponding context switch to transfer execution on core 110 to stealth memory monitor 104. At this time, stealth memory monitor 104 can access the stealth page, thus causing the stealth page to be loaded into cache 102.

The following example explains how accessing the stealth page before another application can use the corresponding cache lines can limit the ability of the other application to ascertain the memory access patterns of application 105. First, consider a circumstance where the access of the stealth memory is not performed. Application 106 executes for some time and accesses a physical memory address that maps to cache line 0. Now, a context switch occurs to application 105, which has allocated but not accessed virtual page 0 (the stealth page). Then, another context switch occurs from application 105 back to application 106. Note that, because application 105 did not access virtual page 0, virtual page 0 would not have been loaded into physical memory while application 105 was executing. The physical memory accessed by application 106 before the first context switch has not been evicted from cache 102. Therefore, application 106 can tell, using timers, that application 105 did not access any memory that maps to cache line 0 during the time when application 105 was executing.

In contrast, by accessing the stealth page after application 105 executes but before allowing application 106 to use the corresponding cache lines, stealth memory monitor 104 can force the virtual page into cache 102. Thus, the physical memory addresses for application 106 that map to cache line 0 will need to be retrieved from memory 103 into cache 102 before application 106 can process them. If these steps are performed for each context switch from application 105 to application 106, application 106 will not be able to discern timing differences across the context switches, because application 106 will need to wait for cache 102 to be populated before processing the data stored at this physical memory address.

Note also that stealth memory can be provided without an explicit request. For example, in some implementations, stealth memory monitor 104 can provide a stealth page to an application when the application starts up, and the stealth page can automatically be allocated to the application's memory space at this time. Likewise, the stealth page can automatically be freed when the application shuts down without receiving an explicit request from the application to do so.

In further implementations, whether an application receives stealth memory on startup can be specified in a configuration file. For example, each application can have a configuration file that specifies whether the application automatically receives stealth memory, and if so, how much stealth memory is automatically provided to the application. Alternatively, stealth memory monitor 104 can maintain the configurations for each application in a global file.

Identifying Physical Pages for Stealth Memory

In the discussion above, it was assumed that no other physical addresses from the bucket with the stealth memory were allocated to other applications when the stealth page was requested. Thus, physical address 0x0000 could be selected for the stealth page. However, stealth memory monitor 104 may have allocated one or more pages of memory in the stealth memory bucket to other applications before receiving the request. In implementations where stealth memory monitor 104 is configured to load the stealth page into cache 102 before allowing a context switch from application 105 to application 106, physical address 0x0000 can still be allocated to application 105 as a stealth page even if other virtual pages have a 0x0 cache bit for the corresponding physical address. This is because, as discussed above, loading the stealth page into the cache before the context switch can prevent the other application from conducting timing attacks.

As mentioned above, however, in some implementations stealth memory monitor 104 locks the stealth memory by ensuring that no physical memory that maps to the same cache line is allocated to other applications. Stealth memory monitor 104 has several different options for doing so. One option is that stealth memory monitor 104 can, upon receiving a request for stealth memory, search cache line ID 305 of page table 300 to identify a cache line that does not appear in this column. Stealth memory monitor 104 can then identify a physical memory address that maps to the identified cache line. In other words, stealth memory monitor 104 can map the stealth page to a physical memory address that does not have any other addresses from the bucket currently assigned to another virtual page.

However, in some cases, there may be no available "free" bucket (cache line) in page table 300, e.g., at least one physical memory address from every bucket has been allocated to some application. In this situation, stealth memory monitor 104 can swap virtual pages to new physical addresses to free a cache line for the stealth memory. For example, stealth memory monitor 104 can identify each of the allocated virtual pages that map to a particular cache line, and map these virtual pages from the old physical addresses to new physical addresses from different buckets. By doing so, stealth memory monitor 104 can free a bucket of addresses that map to a particular cache line, and allocate a physical address that maps to the newly freed cache line (e.g., from the newly-freed bucket) for the stealth page.

Note that memory monitor 104 can perform the swapping of the virtual pages in different ways. For example, memory monitor 104 can copy the data from the old physical addresses to the new physical addresses on memory 104. Alternatively, memory monitor 104 can write the data from the old physical address to non-volatile storage and set the valid flag 306 for the swapped-out page to 0, so that the data can be read into physical memory and assigned to a new physical memory address the next time the virtual page is accessed.

Pages Larger than a Single Cache Line

The discussion above made the simplifying assumption that one page of virtual memory was 16 bytes, so that one page of memory would fit into a single cache line. However, in some implementations, virtual memory page sizes are larger than the amount of data that fits in a single cache line. For example, consider an implementation with 32 byte virtual pages that each include 32 contiguous physical memory addresses. Now, a single page beginning at address 0x0000 can include 16 bytes from 0x0000 to 0x000F, and 16 bytes from 0x0010 to 0x001F. The first group of 16 bytes maps to cache line 0x0, while the second group of 16 bytes maps to cache line 0x1. Under such circumstances, physical memory addresses that map to either cache line 0x0 or 0x1 can be locked at block 405 of method 400. Note that this would reduce the number of buckets from 16 to 8, because twice as many physical memory addresses would be in each bucket.

Set-Associative Caches

As discussed above, cache 102 was introduced in FIG. 2 as a direct-mapped cache. In other words, each physical memory address maps to a single location defined by cache line 201. However, in some implementations, cache 102 can be a set-associative cache. In a set-associative cache, each cache line can include several slots. FIG. 5 illustrates cache 102 in a four-way set associative configuration, and introduces a slot column 501. Each cache line therefore includes a subset of the total number of slots on cache 102.

As shown in FIG. 5, each cache line 201 can include four slots 501, numbered 0, 1, 2, and 3. Any given physical memory address of memory 103 is mapped to a single cache line 201, but can go in any of the four slots for that cache line. Thus, 16 bytes of data from memory address 0x0000 can go into any of slot 0, 1, 2, or 3 of cache line 0x0, 16 bytes from 0x0010 can go into any of slot 0, 1, 2, or 3 of cache line 0x1, etc. Note that this example expands the size of cache 102 by a factor of 4 relative to the example discussed above, e.g., to 1024 bytes or 1 KB. Moreover, in an implementation where a page is 16 bytes, 4 pages of memory can fit in a given cache line 201, e.g., one page in each slot.

Also, note that most modern CPU's with set-associative caches use a least-recently used ("LRU") or pseudo-LRU algorithm for evicting memory addresses from a cache slot. In a "pure" LRU algorithm, when a physical memory address not present in cache 102 is accessed, the least-recently used physical memory address currently present in cache 102 is evicted from its corresponding cache slot, and data is read into cache 102 from the accessed physical memory address. In a pseudo-LRU algorithm, a physical address that is likely to be the least-recently used is evicted.

As discussed above, one way for stealth memory monitor 104 to implement method 400 is to set all the valid flags 306 in page table 300 to false for each page that maps to the same cache line as the stealth page. Because stealth memory monitor 104 is configured to receive page faults each time an application (e.g., 106) attempts to access any invalid page, there is a context switch back to stealth memory monitor 104 before application 106 can access a page in the bucket with the stealth memory. Thus, stealth memory monitor 104 can access the stealth page to load the stealth page into cache 102 before allowing another context switch to application 106. As a result, the stealth page occupies the most recently used slot for the corresponding cache lines immediately after stealth memory monitor 104 does the access of the stealth page. Once application 106 accesses the physical memory that uses the same cache lines as the stealth memory, the stealth page will be the next most recently used data in cache 102, and still will not be evicted from cache 102.

Note, however, that the above-described implementation results in a page fault each time an application attempts to access a page in the same bucket as the stealth page. In some implementations, however, stealth memory monitor 104 can delay the page fault and the corresponding access of the stealth page until the stealth page will be the next physical address that would be evicted from the cache. Thus, for a 4-way set associative cache using a pure LRU replacement algorithm, stealth memory monitor 104 can allow three other physical addresses to be loaded in a given cache line before accessing the stealth page. More generally, for a pure LRU algorithm CPU with a K-way set associative cache, stealth memory monitor 104 can allow K−1 other physical addresses to be loaded into a given cache line before accessing the stealth page. This is possible because of the LRU algorithm used by CPU 101. The stealth page is not evicted from the cache if the stealth page is one of the K−1 most recent accesses to cache 102.

The above implementations may be somewhat modified in circumstances where the CPU implements a pseudo-LRU cache replacement algorithm instead of pure LRU. When pseudo-LRU is employed, the wayness of the cache does not necessarily define the lower bound on the number of cache accesses before the stealth page can be evicted from the cache, e.g., for a 16-way cache, the stealth page might plausibly be evicted after 10 cache accesses instead of 15. Under such circumstances, the above-disclosed technique can still be used by redefining K as the minimum bound (e.g., 10) rather than by the wayness of the cache.

FIG. 6 illustrates another example of page table 300. In FIG. 6, page table 300 is modified relative to FIG. 3. In particular, page table 300 is shown with 8 virtual pages numbered 0-7. Note that the following discussion assumes that a stealth page of memory has already been allocated as virtual page 0, as shown in FIG. 6.

Figure 7:
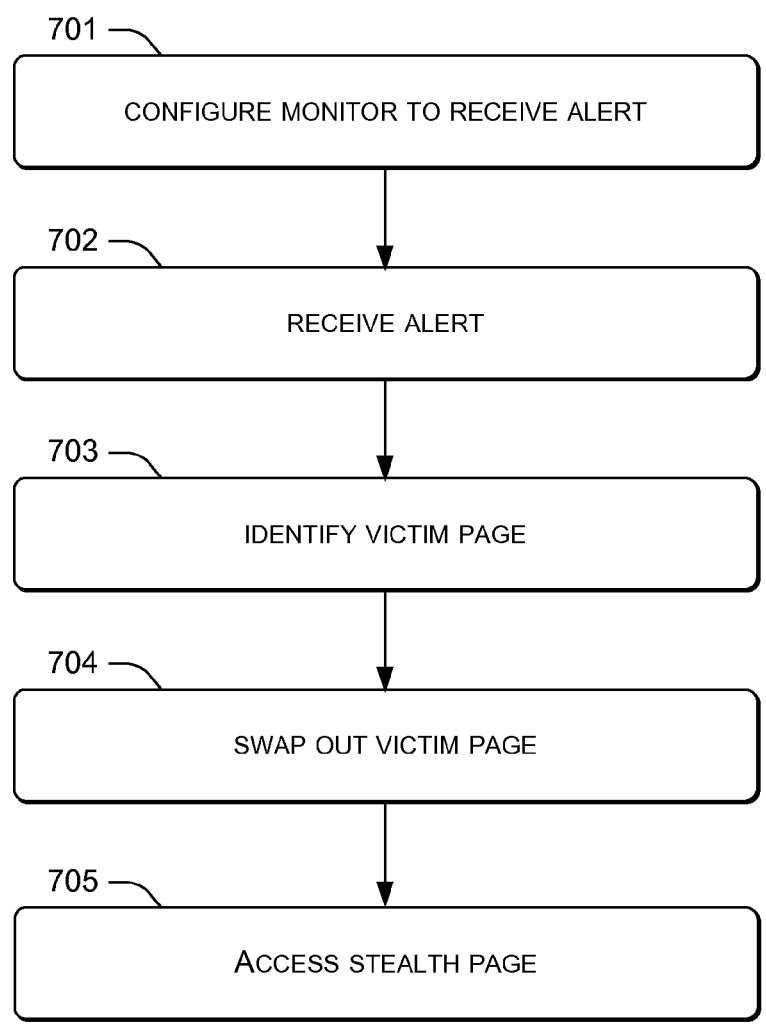

FIG. 7 illustrates a method 700 for providing stealth memory in a CPU with an associative cache. For example, stealth memory monitor 104 can perform method 700 in association with method 400. Note, however, that method 700 is discussed herein as being implemented by stealth memory monitor 104 for exemplary purposes, and is suitable for implementation in various other contexts. Furthermore, method 700 is discussed with respect to system 100, but is also suitable for implementation in various other systems.

Stealth memory monitor 104 can be configured to receive an alert at block 701. For example, stealth memory monitor 104 can set valid flag 306 to 0 for each page in the same bucket as the stealth page. For the purposes of this example, stealth memory monitor 104 can set valid flag 306 to 0 for virtual pages 4-6, each of which has a cache line ID 304 of 0x0 and is allocated to application 106. As discussed above, this means that if application 106 attempts to access any of virtual pages 4-6, a page fault will occur and transfer control of core 110 to stealth memory monitor 104.

Next, an alert is received at block 702. For example, the alert can correspond to a page fault generated by CPU 101. Stealth memory monitor 104 can allow up to K−1 (3 in the current example) page faults to occur and, each time, can set valid flag 306 to true when the page fault is handled and the virtual page is read into physical memory. Generally speaking, this will allow subsequent virtual address translations for the valid pages to occur using page table 300 without causing another page fault.

Thus, in the present example, three page faults can occur at block 702 for virtual pages 4-6. However, note that once 3 valid flags accumulate via page faults for these physical addresses that share the cache lines with the stealth page, the next page fault would normally cause the stealth page to be evicted from cache 102. In this example, an access to virtual page 7 is attempted, causing another page fault.

When the next page fault occurs, method 700 can move to block 703, where a victim page is identified. For example, stealth memory monitor 104 can set valid flag 306 to "0" for the victim page, e.g., virtual page 4, so that virtual page 7 can be read into physical memory. In some implementations, stealth memory monitor 104 can be configured to track which of the pages is the least recently used of the pages that map to the same cache line. This page can be selected by stealth memory monitor 104 as the "victim" that is swapped out to make room for the stealth page. In this example, virtual page 4 is the least-recently used virtual page from the bucket with the stealth memory.

The victim page can be swapped out at block 704. For example, stealth memory monitor 104 can set valid flag 306 to 0. Note that FIG. 7 illustrates page table 300 as it appears at this point in method 700, e.g., virtual pages 5-7 are each shown as valid while virtual page 4 is shown as invalid. Moreover, virtual pages 5-7 are currently available in memory 103 at the physical addresses shown in the page table, and application 106 can access them without causing a page fault. Thus, if application 106 attempts to access page 4 again, stealth memory monitor 104 can read in the data from permanent storage to memory 103.

The stealth page can be accessed at block 705. As discussed, stealth memory monitor 104 can access the stealth page to make the stealth page the most-recently used data in the corresponding cache lines. Because there are only 3 other valid pages in the same bucket as the stealth memory (pages 5-7), application 106 can continually access these three pages during processing without evicting the stealth page from cache 102. Furthermore, FIG. 5 illustrates cache 102 in this configuration, e.g., tag 202 of cache 102 includes the tags of stealth page 0 (0x00) and pages 5-7 (0x04, 0x06, and 0x08).

Note that the next memory access that would result in evicting the stealth page from the cache (e.g., another access to virtual page 4) will cause another page fault. This, in turn, can cause stealth memory monitor 104 to access the stealth page and once again make the stealth page the most-recently used data in cache 102. Until this happens, virtual pages 5-7 can remain valid and in physical memory without causing another page fault.

Stealth Pages for Multiple Cores

As discussed above, system 100 can include multiple cores, e.g., cores 110-140, and each core can access cache 102 independently. Now consider a circumstance where application 105 is executing on core 110 and application 106 is executing concurrently on core 120. Under these circumstances, there is not normally a context switch between each overlapping operation by applications 105 and 106, because the applications are not being time-shared on a single core. This means that application 106 could observe application 105's cache accesses unless further steps are taken to prevent this from happening.

In some implementations, stealth memory monitor 104 can address this scenario by using different sets of cache lines for each core. For example, cache line 0x0 could be restricted for use by core 110, cache line 0x1 could be restricted for use by core 120, 0x2 for core 130, and 0x3 for core 140. This would leave cache lines 0x4-0xF open for use by any of cores 110-140. In this implementation, stealth pages are selected for each core in physical memory such that they map to the restricted cache lines. In other words, the stealth page for core 110 would be located at a physical address with 0x0 as the third nibble, 0x1 for core 120, etc.

In some implementations, each core can have its own page table. To restrict the cache lines for use by individual cores, the page tables for the other cores can be configured to exclude physical addresses from the restricted cache lines. As an example, if cache line 0x0 is restricted for use by core 110, the page tables for cores 120, 130, and 140 would not include physical addresses that map to cache line 0x0.

Also, in some implementations, there may be several caches at the same level that are shared by different sets of processor cores. For example, 16 cores could be shared amongst four caches by having four cores use the first cache, four cores use the second cache, etc. In such implementations, the buckets can be selected based on the number of processors that share each cache, e.g., four buckets in this example can be used to provide one stealth page to each of the 16 processor cores. For example, a first bucket of addresses can have a stealth page assigned to one core from the first group, another stealth page assigned to one core from the second group, etc.

If no time sharing is performed on any of cores 110-140, then this implementation may be sufficient to achieve the above-noted objectives for stealth memory. This is because the applications on the other cores will not have access to the same cache lines as the stealth memory. However, if time-sharing is to be performed on the cores, then other applications can access the same cache lines as the stealth page. Generally speaking, this can be addressed by preserving the data in the stealth page during context switches.

For example, consider a circumstance where applications 105 and 106 are time-sharing core 110 and each application is using a stealth page. Here, the context switch from application 105 to application 106 can include copying the stealth memory page to a backup page for application 105 by stealth memory monitor 104. Application 106 can then run for some time using the stealth page. When the context switch back to application 105 occurs, the data can be read from the backup page for application 105 into the stealth page. In other words, the same physical page can be used as a stealth page for both applications 105 and 106, and backups of the data in the stealth page can be used to handle the context switch.

Using backup pages in this manner can involve a certain amount of processing overhead to copy the stealth page in and out of the backup page during the context switches. In other implementations, a stealth page is maintained as a separate physical page for each application executing on a given core. Thus, instead of creating a backup of the stealth page in permanent storage on the context switch from application 105 to 106, stealth memory monitor 104 can leave the stealth page for application 105 in physical memory and use a different physical address for a stealth page for application 106. Under these circumstances, the techniques discussed above for time-sharing can be used to prevent application 106 from monitoring memory access patterns for application 105. Specifically, stealth memory monitor 104 can access the stealth page for application 105 before allowing the context switch to application 106, thus placing the contents of the stealth page in cache 102.

Generally speaking, given a K-way associative cache employing a pure LRU algorithm, stealth memory monitor 104 can dedicate up to K stealth pages per core. As discussed above, when using pseudo-LRU, K can be redefined as the minimum bound on the number of accesses to a given cache line before data is evicted from the cache line. By defining K this way, there are K cache slots available before one of the stealth pages can be evicted, i.e., up to K stealth pages can be loaded in the cache before one of them is evicted. Alternatively, as discussed above, a single stealth page can be used for each core, and up to K−1 pages can be accessed without causing a page fault because the single stealth page plus the K−1 other pages can be loaded in the cache before one of them is evicted.

These two ideas can be combined by dividing up the cache lines as follows. Consider an 8-way set-associative cache using a pure LRU algorithm. Four pages of stealth memory could be allocated per core. This would allow up to four other page accesses before one of the four stealth pages would be evicted from the cache. More generally, for a K-way associative cache with N stealth pages, up to K−N pages from the stealth memory bucket can remain valid in page table 300 before a page is invalidated. When the (K−N)+1 access by a new virtual page occurs, CPU 101 generates a corresponding page fault, which in turn invokes stealth memory monitor 104 to access the least-recently used stealth page. Using this technique, all K stealth pages can be maintained in the cache while still allowing K−N other pages to remain valid in page table 300. This technique can also be generalized for pseudo-LRU caches using the lower bound as K instead of defining K as the wayness of the cache.

Performance Considerations

In the implementations discussed above, a virtual page for application 106 could be mapped to a physical address that mapped to the same cache lines as the stealth page for application 105. As discussed, this can be handled by having stealth memory monitor 104 configure page table 300 so that page faults are generated whenever application 106 accesses one of the virtual pages in the same bucket as the stealth page. However, if application 106 accesses such pages frequently, this can result in a performance penalty due to the frequent page faults.

In some implementations, stealth memory monitor 104 can be configured to swap out pages to different physical addresses. For example, consider a frequently-accessed page allocated to application 106 that maps to the same cache lines as the stealth page for application 105. Because application 106 accesses this page frequently, the page will often be loaded into cache 102. In turn, stealth memory monitor 104 will frequently access the stealth page to ensure that the stealth page remains in the cache. However, stealth memory monitor 104 can swap the frequently-accessed page for application 106 to a different physical address that does not also map to the same cache lines as the stealth page. This can reduce the number of page faults, because the frequently-accessed page does not need to be configured to generate page faults as would be the case if the frequently-accessed page were still in the same bucket as the stealth memory.

In some implementations, stealth memory monitor 104 can be configured to track the number of page faults generated by the pages in page table 300. In particular, stealth memory monitor 104 can track the page faults by each page that maps to the same cache lines as the stealth page. Stealth memory monitor 104 can be configured to swap out one or more of the pages that most frequently generate page faults to different physical addresses that do not map to the same cache lines as the stealth page.

Note also that the contents of a given page may provide some information about whether the page is likely to generate frequent page faults. For example, if a page includes many executable instructions instead of data, the page may include or be part of a code segment for a given application. Such pages may be more likely than other pages to generate many page faults, and can be selected by stealth memory monitor 104 to be swapped out. As another example, pages that exhibit sequential accesses in increasing or decreasing order can be indicative of executing code or a data array that is likely to cause frequent page faults. Accordingly, stealth memory monitor 104 can also be configured to select pages that exhibit such behavior for swapping out to different physical addresses.

Furthermore, note that the different techniques discussed above for locking stealth pages have different performance characteristics. Generally speaking, locking stealth pages by (1) preventing other applications from accessing the same bucket as the stealth memory results in fewer page faults than the alternative technique (2) of accessing the stealth memory before allowing another application to access memory from the bucket. Fewer page faults can, in turn, result in better performance. However, if there is a shortage of physical memory, it may be better to allow other applications to access the bucket. This is because a shortage of physical memory can result in repeatedly swapping from physical memory to permanent storage. Thus, under circumstances where there is a shortage of physical memory, it may be beneficial for stealth memory monitor 104 to use technique (2), because this technique frees up some physical memory relative to technique (1).

In some implementations, stealth memory monitor 104 can be configured to dynamically switch between techniques (1) and (2) depending on physical memory utilization. For example, a threshold utilization (e.g., 90%) could be predefined for switching to technique (2). At any given time, stealth memory monitor 104 can compare current physical memory utilization to the threshold. If the current utilization is less than or equal to the threshold, stealth memory monitor 104 can use technique 1. Once physical memory utilization exceeds the threshold, stealth memory monitor 104 can switch to technique 2.

CONCLUSION

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system comprising:
   two or more processor cores;
   a set associative cache having a plurality of cache lines, each cache line having multiple slots;
   a memory; and
   a memory monitor configured to:
     select a physical address on the memory for use by a first one of the two or more processor cores;
     provide a first page of stealth memory to a first application, the first page of stealth memory being located at the selected physical address, wherein the selected physical address is mapped to an individual cache line and loaded into an individual slot of the individual cache line; and
     retain the first page of stealth memory in the set associative cache while allowing at least one other physical address to be loaded into another slot of the individual cache line without evicting the selected physical address from the individual slot of the individual cache line.

2. The system according to claim 1, wherein:
   each cache line has at least four slots, and
   the memory monitor is configured to retain the first page of stealth memory in the set associative cache while allowing at least two other physical addresses to be loaded into other slots of the individual cache line without evicting the selected physical address from the individual slot of the individual cache line.

3. The system according to claim 1, wherein the first page of stealth memory is provided to the first application responsive to a request received from the first application.

4. The system according to claim 3, wherein the first application comprises a virtual machine, and the memory monitor comprises a virtual machine monitor.

5. The system according to claim 4, wherein the memory monitor is further configured to:
after the at least one other physical address is loaded into the another slot of the individual cache line, access the stealth memory to retain the page of stealth memory in the cache.

6. The system according to claim 1, wherein the memory monitor is further configured to:
maintain the first page of stealth memory for the first processor core and a second page of stealth memory for a second processor core of the two or more processor cores as separate physical pages.

7. A method performed on a computer system having a first processor core, a second processor core, and a cache shared by the first processor core and the second processor core, the method comprising:
providing, to a first application that executes on the first processor core, first stealth memory that maps to an individual cache line of the cache;
retaining the first stealth memory in a first slot of the individual cache line while allowing at least some other memory to be loaded into a second slot of the individual cache line without evicting the stealth memory from the first slot of the individual cache line; and
preventing the second processor core from accessing the individual cache line.

8. The method of claim 7, wherein the preventing comprises preventing a second application that executes on the second processor core from accessing individual physical memory addresses that map to the individual cache line.

9. The method of claim 8, wherein the preventing comprises maintaining a first page table for the first processor core and a second page table for the second processor core and excluding the individual physical memory addresses from the second page table.

10. The method according to claim 7, further comprising:
providing, to a second application that executes on the second processor core, second stealth memory that maps to a second cache line of the cache; and
preventing the first processing core from accessing the second cache line.

11. The method of claim 7, further comprising:
performing a context switch on the first processor core from the first application to another first application that also executes on the first processor core.

12. The method of claim 11, wherein the performing the context switch comprises:
backing up first data stored in the first stealth memory for the first application.

13. The method of claim 12, wherein the performing the context switch comprises:
providing the first stealth memory to the another first application after backing up the first data for the first application.

14. The method of claim 11, further comprising:
accessing the first stealth memory before the context switch.

15. A system comprising:
a processing unit including:
a first processor core,
a second processor core, and
a cache having a first cache line with multiple first slots and a second cache line with multiple second slots; and
a memory device having first physical addresses that map to the first cache line and second physical addresses that map to the second cache line,
the memory storing computer-readable instructions which, when executed by the processing unit, cause the processing unit to:
restrict the first physical addresses on the memory device for use by the first processor core and not the second processor core;
provide stealth memory located at an individual first physical address and cause the stealth memory to be stored in an individual first slot of the first cache line; and
retain the stealth memory in the individual first slot of the first cache line while allowing at least some other memory to be loaded into an individual second slot of the first cache line without evicting the stealth memory from the first slot of the individual cache line.

16. The system of claim 15, wherein the computer-readable instructions cause the processing unit to:
allocate the second physical addresses to the second processor core and not the first processor core.

17. The system of claim 16, wherein the computer-readable instructions cause the processing unit to:
allow third memory addresses on the memory device that map to a third cache line of the cache to be used by both the first processor core and the second processor core.

18. The system of claim 15, wherein the computer-readable instructions cause the processing unit to:
allocate the stealth memory to a first application that executes on the first processor core.

19. The system of claim 18, wherein the computer-readable instructions cause the processing unit to:
provide the stealth memory to another first application that also executes on the first processor core.

20. The system of claim 15, wherein the computer-readable instructions cause the processing unit to:
access the stealth memory allocated to the first application before a context switch on the first processor core from the first application to another first application;
provide other stealth memory to the another first application; and
access the other stealth memory before another context switch on the first processor core from the another first application to the first application.

* * * * *